US012656893B2

(12) United States Patent
   Cheng et al.

(10) Patent No.: US 12,656,893 B2
(45) Date of Patent: Jun. 16, 2026

(54) EXTENDING TOUCH-SENSITIVE REGIONS ON ELECTRONIC DEVICES

(71) Applicant: Google LLC, Mountain View, CA (US)

(72) Inventors: Gang Cheng, Burlingame, CA (US); Chih Chun Chang, Hsinchu City (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/889,630

(22) Filed: Sep. 19, 2024

(65) Prior Publication Data

US 2025/0138660 A1 May 1, 2025

Related U.S. Application Data

(60) Provisional application No. 63/595,217, filed on Nov. 1, 2023.

(51) Int. Cl.
   *G06F 3/041* (2006.01)
   *G06F 3/044* (2006.01)

(52) U.S. Cl.
   CPC ............ *G06F 3/0412* (2013.01); *G06F 3/044* (2013.01)

(58) Field of Classification Search
   CPC ......... G06F 3/0412; G06F 3/044; G06F 1/163
   See application file for complete search history.

(56) References Cited

U.S. PATENT DOCUMENTS

| | | | |
|---|---|---|---|
| 2017/0090614 A1* | 3/2017 | Kuboyama | .......... G06F 1/1643 |
| 2025/0147778 A1* | 5/2025 | Wang | .................... G06F 3/0485 |

* cited by examiner

*Primary Examiner* — Robin J Mishler
(74) *Attorney, Agent, or Firm* — Colby Nipper PLLC

(57) ABSTRACT

This document describes systems and techniques directed at extending touch-sensitive regions in electronic devices. In aspects, an electronic device includes a cover layer, a touch sensor panel, and an electronic visual display panel ("display panel"). The cover layer includes a top face and a side face. The touch sensor panel has a first sensing region corresponding to a surface of the top face and a second sensing region at least partially corresponding to a second surface of the side face. The display panel has an active area corresponding at least partially to the first surface of the top face. The active area of the touch sensor panel is greater than an active area of the display panel. Despite the display panel and the touch sensor panel having different active area sizes, an integrated circuit is configured to control both of them, maximizing an internal volumetric efficiency.

20 Claims, 6 Drawing Sheets

Section View: A-A

Section View: A-A

102

102-1

102-2

102-3

102-4

102-5

102-6

200

| Housing |
| 104 |

| Processor(s) |
| 202 |

Computer-Readable
Media
204

Operating System
206

Sensor(s)
208

Display Panel Stack
106

Cover Layer
108

Touch-Sensitive Layer
110

Electronic Visual Display Layer
112

Integrated Circuit
118

*FIG. 2*

EXTENDING TOUCH-SENSITIVE REGIONS ON ELECTRONIC DEVICES

CROSS-REFERENCE TO RELATED APPLICATION(S)

This application claims priority to U.S. Provisional Patent Application Ser. No. 63/595,217, filed on Nov. 1, 2023, the disclosure of which is incorporated by reference herein in its entirety.

BACKGROUND

Wearable electronic devices, such as virtual-reality goggles and smartwatches, are increasing in popularity. These wearable devices are able to synchronize and communicate wireless data with other devices, including non-wearable devices like smartphones and laptops. Such wireless interconnectivity promotes user connectivity, productivity, and efficiency. In one example, upon receipt of an email notification, a laptop can wirelessly transmit the email notification to a smartwatch for viewing on its respective display. This technique and others like it afforded by wearable devices provide many conveniences and are therefore highly valued by users.

Wearable electronic devices also provide users convenient manners by which to access, control, or navigate their devices. For instance, some wearable devices permit users to speak voice commands to call family, perform in-the-air gestures to skip songs, offer biometric identifiers to unlock devices, squeeze a housing of a device to activate an intelligent virtual assistant, and other such techniques. These methods of interaction expedite user-input and device-output techniques, enhancing user experience by enabling users to quickly and conveniently operate their device. One popular method of interaction includes enabling users to provide touch input at touch-sensitive displays. Through this method of interaction, users can interact with graphical user interfaces and elements thereon.

SUMMARY

This document describes systems and techniques directed at extending touch-sensitive regions in electronic devices. In aspects, an electronic device includes a cover layer, a touch sensor panel, and an electronic visual display panel ("display panel"). The cover layer includes a top face and a side face. The touch sensor panel has a first sensing region corresponding to a surface of the top face and a second sensing region at least partially corresponding to a second surface of the side face. The display panel has an active area corresponding at least partially to the first surface of the top face. The active area of the touch sensor panel is greater than an active area of the display panel. Despite the display panel and the touch sensor panel having different active area sizes, an integrated circuit is configured to control both of them, maximizing an internal volumetric efficiency.

In aspects, an electronic device is disclosed that includes a housing and a display panel stack that when attached to the housing defines an internal cavity. The display panel stack includes a cover layer disposed as a topmost layer. The cover layer includes a top face and a side face. The top face has a normal axis less than or equal to 45 degrees from a z-axis. The side face has a normal axis greater than 45 degrees from a z-axis. The display panel stack further includes a touch sensor panel disposed beneath the cover layer. The touch sensor panel has a first sensing region corresponding to a surface of the top face and a second sensing region at least partially corresponding to a second surface of the side face. The display panel stack further includes a display panel disposed beneath the touch sensor panel. The display panel has an active area corresponding at least partially to the first surface of the top face. The display panel is dimensionally smaller than the touch sensor panel in at least one dimension. The electronic device further includes an integrated circuit configured to control both the touch sensor panel and the display panel, as well as one or more processors. The electronic device also includes a memory storing instructions that, when executed by the one or more processors, cause the one or more processors to direct the integrated circuit to receive touch input data at the touch sensor panel and cause the display panel to illuminate.

This Summary is provided to introduce simplified concepts of systems and techniques directed at extending touch-sensitive regions in electronic devices, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques directed at extending touch-sensitive regions in electronic devices are described in this document with reference to the following drawings:

FIG. 2 illustrates example electronic devices in which extending touch-sensitive regions can be implemented;

The same numbers are used throughout the Drawings to reference like features and components.

DETAILED DESCRIPTION

Overview

Figure 1:
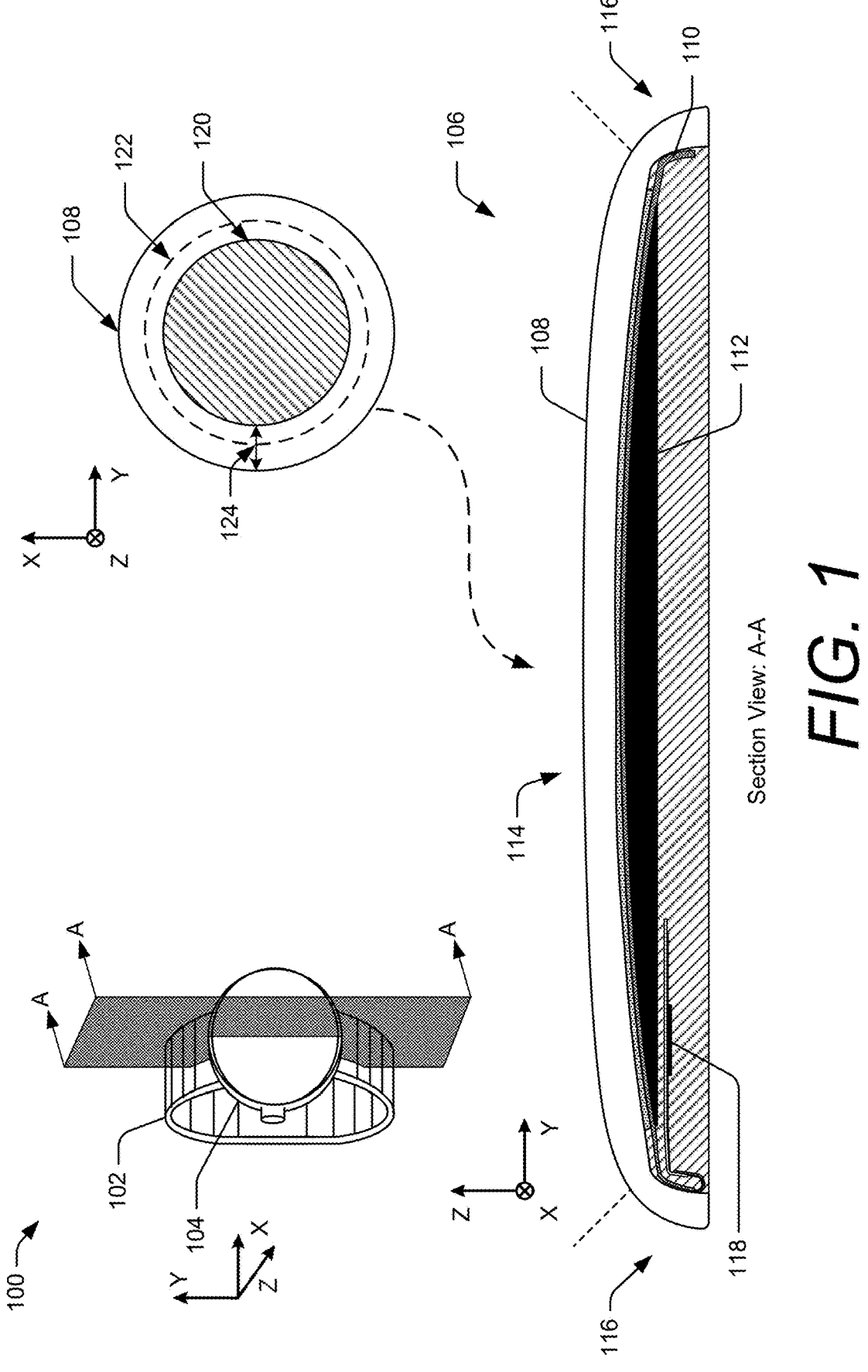
FIG. 1 illustrates an example implementation of an electronic device with a display panel stack in accordance with one or more implementations.

Many electronic devices include displays, such as light-emitting diode (LED) displays and liquid crystal displays (LCDs). These displays often include a pixel array having tens of thousands of pixels organized into a two-dimensional grid (e.g., circular grid, rectangular grid). To power and control the pixel array, displays may include driving circuitry, surrounding the perimeter of the pixel array, connecting the pixels to one or more drivers. As an example, a pixel array having a two-dimensional rectangular grid of pixels can be operably coupled to one or more row-line drivers via electrical traces (e.g., routing lines, wires) positioned around the rectangular grid.

Electronic device manufactures generally fabricate these displays in a layered structure, often referred to as a "display panel stack." The display panel stack includes a cover layer (e.g., cover glass) and a display panel module (e.g., electronic visual display panel, pixel array, driving circuitry). The display panel stack also includes a touch sensor panel (e.g., a capacitive touch sensing panel) for the user to interact with the display of the electronic device (e.g., a smartphone). Before a cover layer is bonded to the top of a display panel stack, an opaque border, often referred to as an "ink mask," may be added to the underside of the cover layer, defining a display bezel. Users of electronic devices often desire compact, aesthetic electronic devices with large display active areas. However, many electronic devices inefficiently utilize an internal volume, leading to larger devices. For instance, one or more sensors, actuators, or displays may utilize a dedicated driver. Having a dedicated driver for each electronic component may consume a significant amount of space within an electronic device.

To this end, this document describes systems and techniques directed at extending touch-sensitive regions in electronic devices. In aspects, an electronic device includes a cover layer, a touch sensor panel, and an electronic visual display panel ("display panel"). The cover layer includes a top face and a side face. The touch sensor panel has a first sensing region corresponding to a surface of the top face and a second sensing region at least partially corresponding to a second surface of the side face. The display panel has an active area corresponding at least partially to the first surface of the top face. The active area of the touch sensor panel is greater than an active area of the display panel. Despite the display panel and the touch sensor panel having different active area sizes, an integrated circuit is configured to control both of them, maximizing an internal volumetric efficiency.

Example Implementations

The following discussion describes example implementations, techniques, and apparatuses that may be employed in the example implementations, and various devices in which components of extending touch-sensitive regions in electronic devices can be embodied. In the context of the present document, reference is made to the following by way of example only.

FIG. 1 illustrates an example implementation 100 of an example electronic device 102. As illustrated, the example electronic device 102 is a watch, but in alternative implementations (not illustrated in FIG. 1) the example electronic device 102 can be a smartphone, a laptop, a smarthome management device, or other such device. In aspects, the example electronic device 102 includes a housing 104 and a display panel stack 106. In implementations, the housing 104 at least partially surrounds and attaches to the display panel stack 106. For example, the display panel stack 106 includes a cover layer 108 (e.g., a cover glass), a touch sensor panel (e.g., a capacitive touch sensing panel) 110, and an electronic visual display panel 112 ("display panel 112"). At least one face of the cover layer 108 may be partially (or fully) in contact with or disposed adjacent to the housing 104. As a further example, the cover layer 108 includes a top face 114 and a side face 116. The side face may extend a perimeter of (e.g., encircling) the top face 114. At least portions of the side face 116 may be positioned to be in contact with or disposed adjacent to the housing 104. Together, the housing 104 and the display panel stack 106 may define an internal cavity within which one or more electronic components can be disposed.

In implementations, a single integrated circuit 118 (e.g., having a driver for the touch sensor panel 110 and a driver for the display panel 110) is operatively coupled to and configured to control both the touch sensor panel 110 and the display panel 112. As illustrated in FIG. 1, for example only and not by way of limitation, the integrated circuit 118 is disposed within the internal cavity adjacent to the display panel stack 106 opposite the cover layer 108. In alternative implementations, the integrated circuit 118 is disposed within the internal cavity proximate but not adjacent to the display panel stack 106.

Often, an electronic device includes a touch sensor panel having its own dedicated integrated circuit and a display panel its own dedicated integrated circuit. However, such an implementation consumes space within an already spaced-constrained electronic device. To maximize a volumetric efficiency within an internal cavity of an electronic device, the techniques described herein enable a touch sensor panel and a display panel to be controlled by a single integrated circuit that is configured in such a manner so as to accommodate touch sensing and display illumination for a touch sensor panel and a display panel, respectively, of differing sizes. Such an integrated circuit can implement this using touch and display driver integration (TDDI) with additional configurations to account for dimensionally-disparate panels. In this way, a single touch sensor panel may be utilized to detect touch gestures along the top face 114 and the side face 116 of the cover layer 108 of the electronic device 102.

The cover layer 108 may be exposed to an external environment surrounding the electronic device 102 and may serve as a barrier to ingress contaminants (e.g., dust, dirt, water). The cover layer 108 may be implemented as a plastic cover layer or as a glass cover layer. In some implementations, the cover layer is shaped similar to an end cap of a rounded cylinder, such as a soft dome shape ("SDOM").

The display panel 112 includes an active area 120 (e.g., an area within which the display panel illuminates, an area of illumination visible to a user) that positionally-corresponds, at least partially, with a first surface of the top face 114 of the cover layer 108. The touch sensor panel 110 includes an active area 122 (e.g., an area where touch events may be detected) that also positionally-corresponds with the first surface of the top face 114 of the cover layer 108 and at least portions of a second surface of the side face 116. The top face 114 may be defined as a region where normal vectors at points on the first surface of the cover layer 108 form an angle that is less than or equal to 45 degrees with a z-axis (e.g., an axis through a geometric center of the cover layer). The side face 116 may be defined as a region where normal vector at points on the second surface of the cover layer 108 forms an angle that is greater than 45 degrees with the z-axis. In implementations, a border from a top view of the cover layer 108 extends a distance 124 from a border of the display panel active area 120. In this way, the touch active area 122 may be larger than the display active area 120 in at least one dimension (e.g., a diameter, a length, in a projected plane). For example, at least one of a diameter, a length, or a width of the touch active area 122 may be larger than a diameter, a length, or a width, respectively, of the display active area 120.

FIG. 2 illustrates example electronic devices 102 in which extending touch-sensitive regions can be implemented. The electronic devices 102 may include additional components and interfaces omitted from FIG. 2 for the sake of clarity. FIG. 2 is described in the context of FIG. 1 and may include one or more like components or features from FIG. 1. Common parts are shown with like reference numerals and may not be described again. The electronic devices 102 can be any of a variety of consumer electronic devices. As non-limiting examples, the electronic device 102 can be a mobile phone 102-1, a tablet device 102-2, a laptop computer 102-3, a portable video game console 102-4, a watch 102-5, a smart home control device 102-6 (e.g., a thermostat), and the like.

The electronic device 102 includes the housing 104 that, when joined with the cover layer 108, defines at least one internal cavity within which one or more of a plurality of electronic components may be disposed. In implementations, a mechanical frame may define one or more portions of the housing 104. As an example, a mechanical frame can include plastic or metallic walls that define portions of the housing 104. A mechanical frame may also support one or more portions of the housing 104. One or more exterior housing components (e.g., plastic panels) can be attached to the mechanical frame (e.g., a chassis) and, in doing so, the mechanical frame physically supports the one or more exterior housing components, which define portions of the housing 104. In additional implementations, the mechanical frame and/or the exterior housing components may be composed of crystalline or non-crystalline (e.g., metals, plastics) inorganic solids.

These mechanical frames can be designed in a variety of configurations. In implementations, the mechanical frame may be designed with a bucket architecture. As an example, a mechanical frame designed with a bucket architecture defines an open-sided polyhedron (e.g., an open-sided rectangular prism). A mechanical frame may include more than one open side, defining a partial or full skeletal polyhedron (e.g., a polyhedron structure in which vertices and edges are defined by rods and two or more faces are absent). Exterior housing components (e.g., plastic panels) can then be attached to the mechanical frame to define an open-sided polyhedron. The housing 104 may be sealed through the inclusion of the display panel stack 106 (e.g., the cover layer 108), defining at least one internal cavity.

The electronic device 102 may further include one or more processors 202. The processor(s) 202 can include, as non-limiting examples, a system on a chip (SoC), an application processor (AP), a central processing unit (CPU), or a graphics processing unit (GPU). The processor(s) 202 generally execute commands and processes utilized by the electronic device 102 and an operating system installed thereon. For example, the processor(s) 202 may perform operations to facilitate the presentation of content on the electronic visual display panel 112 ("display panel 112") and can perform other specific computational tasks.

The electronic device 102 may also include computer-readable storage media (CRM) 204. The CRM 204 may be a suitable storage device configured to store device data of the electronic device 102, user data, and multimedia data. The CRM 204 may store an operating system 206 that generally manages hardware and software resources (e.g., the applications) of the electronic device 102 and provides common services for applications stored on the CRM 204. The operating system 206 and the applications are generally executable by the processor(s) 202 to enable communications and user interaction with the electronic device 102. One or more processor(s) 202, such as a GPU, perform operations to display graphics of the electronic device 102 on the display panel 112 and can perform other specific computational tasks. The processor(s) 202 can be single-core or multiple-core processors.

The electronic device 102 may further include one or more sensors 208. The sensor(s) 208 can include any of a variety of sensors, such as an audio sensor (e.g., a microphone), a touch-input sensor (e.g., a touchscreen), an image-capture device (e.g., a camera, video-camera), proximity sensors (e.g., capacitive sensors), an under-display fingerprint sensor, or an ambient light sensor (e.g., photodetector).

Further, the electronic device 102 includes the display panel stack 106 having the cover layer 108, the touch sensor panel 110, and the electronic visual display panel 112 ("display panel 112"). The cover layer 108 may be implemented as any of a variety of transparent materials, including polymers (e.g., plastic, acrylic) or glasses.

The display panel 112 may include a two-dimensional pixel array (not illustrated in FIG. 2) forming a grid, operatively coupled to one or more row-line drivers via electrical traces. The pixel array generates light to create an image on the display panel stack 106 upon electrical activation by one or more drivers. As an example, data-line drivers provide voltage data via electrical traces to the pixel array to control luminance levels of individual pixels. The display panel 112 may have an active area that is smaller than an active area of the touch sensor panel 110 (see FIG. 1).

Further, the electronic device 102 includes an integrated circuit 118. The integrated circuit 118 may be operatively coupled to and control the touch sensor panel 110 and the display panel 112. In implementations, the integrated circuit 118 may be implemented with touch and display driver integration (TDDI), allowing the integrated circuit to handle inputs from both the touch sensor panel 110 and the display panel 112, despite the touch sensor panel 110 and the display panel 112 having different active area sizes. This integration contributes to maximizing an internal volumetric efficiency of the electronic device 102, while still allowing a user to preform input gestures along an area outside of the active area of the display panel 112.

Figure 3:
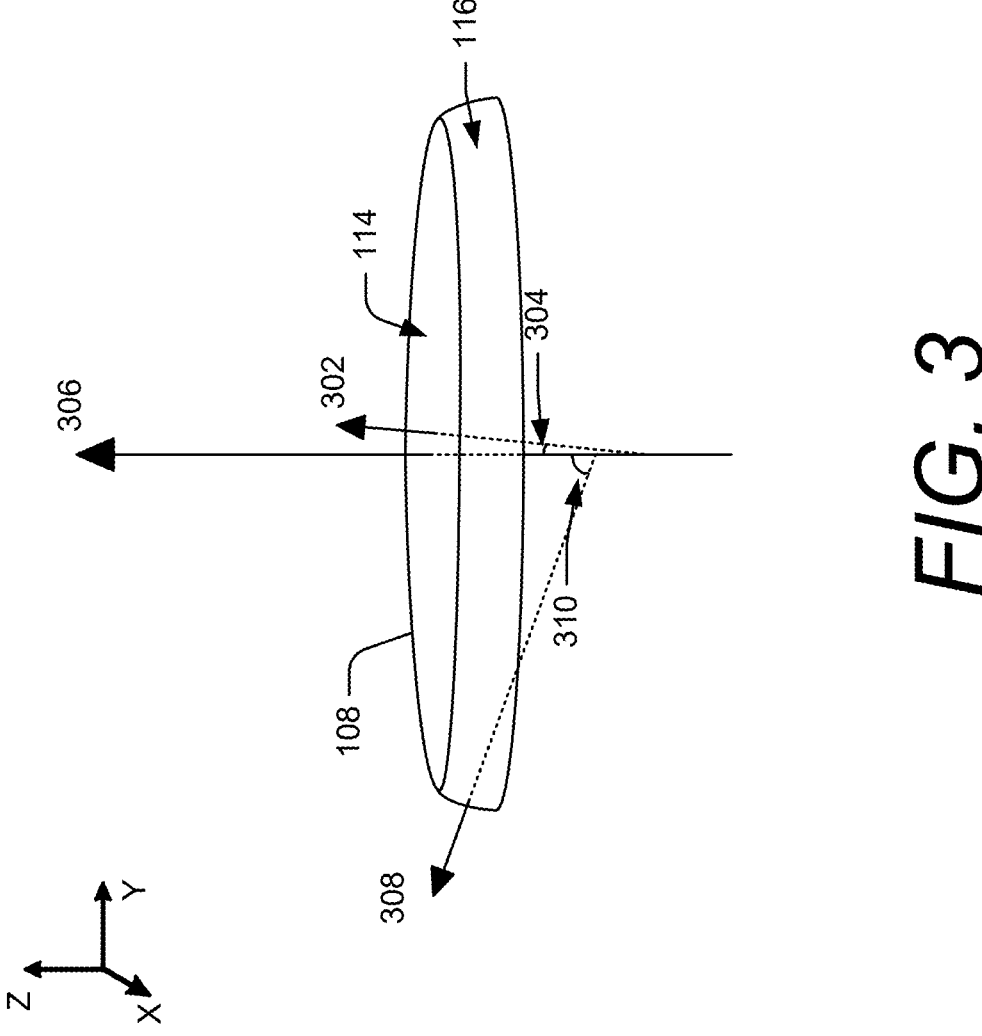
FIG. 3 illustrates an example cover layer including a top face and a side face in accordance with one or more implementations.
Figure 3:
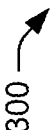

FIG. 3 illustrates an example implementation 300 of the cover layer 108 including the top face 114 and the side face 116 in accordance with one or more implementations. A dome (e.g., a partial sphere, a SDOM) has multiple normal vectors, one for each point on its curved surface. The normal vector at any point on the dome's surface points perpendicular to the tangent plane at that point, similar to the normal vectors on a complete sphere. For a hemispherical dome centered at $(x_c, y_c, z_c)$ with radius (r), the normal vector at a point $(x_0, y_0, z_0)$ on the surface of the dome can be calculated as:

$$\vec{N} = (x_0 - x_c, y_0 - y_c, z_0 - z_c)$$

This vector points from the center of the sphere (or dome) to the point on its surface. If the dome is a segment of a sphere (a spherical cap) rather than a full hemisphere, the normal vectors are still determined in the same manner: perpendicular to the tangent plane at each point on the surface. For example, consider a dome with the center of its base at the origin (0, 0, 0) and its highest point at (0, 0, r). The normal vector at any point (x, y, z) on the dome's surface would be:

$$\vec{N} = (x, y, z - r)$$

This vector points radially outward from the center of the base to the point on the dome's surface. Each point on the dome has a unique normal vector, making the surface have multiple normal axes.

As illustrated, the top face 114 may have a first surface having a first point with a first normal vector 302 (e.g., a vector perpendicular to the slope of the surface at a point) with a first angle 304 from a z-axis 306 (e.g., pointing up through a geometric center of the cover layer 108) that is less than or equal to 45 degrees. The side face 116 may have a second surface having a second point with a second normal vector 308 with a second angle 310 from the z-axis 306 that is greater than 45 degrees. In implementations, the cover layer 108 may be any of a variety of transparent materials, including a polymer (e.g., plastic, acrylic).

Figure 4:
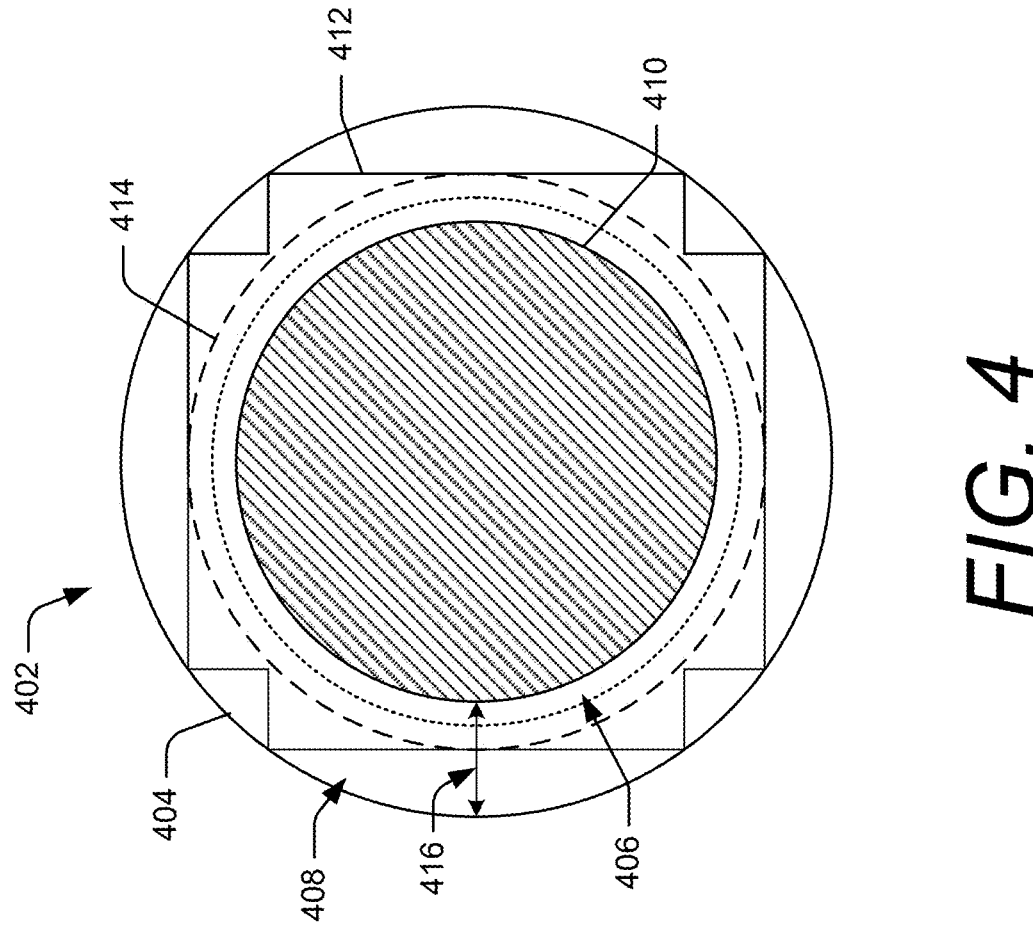
FIG. 4 illustrates an example layout of active areas of the display panel stack from a top view in accordance with one or more implementations.
Figure 4:
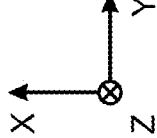
Figure 4:

FIG. 4 illustrates an example layout 400 of active areas of a display panel stack 402 from a top view in accordance with one or more implementations. The display panel stack 402 may include additional components and interfaces omitted from FIG. 4 for the sake of clarity. As illustrated, from a two-dimensional layout perspective, the display panel stack 402 includes a cover layer 404 with a top face 406 and a side face 408. The display panel stack 402 also includes a display panel (not illustrated in FIG. 4) with an active area 410 and a touch sensor panel 412 with an active area 414. A border of the cover layer 404 extends a distance 416 from the display active area 410. In some implementations, a border of the cover layer 404 may extend less than 20 millimeters but greater than 10 millimeters from a geometric center of the cover layer 404. In additional implementations, a border of the cover layer 404 may extend less than 5 millimeters but greater than 2 millimeters from an edge of an active area 410 of a display panel.

In implementations, at least one of a layout (e.g., the two-dimensional layout as illustrated in FIG. 4) of the display panel, a layout of the display active area 410, a layout of the touch sensor panel 412, or a layout of the touch active area 414 may form any of a variety of two-dimensional shapes, including regular (e.g., rectangular, elliptical) or irregular shapes. Any one of these may be a similar or different shape to any other.

The touch active area 414 may be larger than the display active area 410 in at least one dimension. For example, at least one of a diameter, a length, or a width of the touch active area 414 may be larger than a diameter, a length, or a width, respectively, of the display active area 410. Portions of the touch active area 414 that extend beyond the physical dimensions of the display panel may be referred to as extended regions.

In some implementations, the extended regions may extend beyond at least one of a diameter, a length, or a width of the top face 406 of the cover layer 404 and extend substantially parallel with at least portions of the side face 408 of the cover layer, such that the extended regions are disposed adjacent to the side face 408 (e.g., an internal side of the side face 408) for at least portions within an internal cavity defined by the cover layer 108 and a housing (not illustrated in FIG. 4).

An integrated circuit (not illustrated in FIG. 3) may be operatively coupled to and control the touch sensor panel 412 and the display panel (not illustrated in FIG. 4). In implementations, the integrated circuit may include touch and display driver integration (TDDI) that allows the integrated circuit to handle inputs from both the touch sensor panel 412 and the display panel, despite the touch sensor panel 412 and the display panel having different active area sizes. In this way, a single touch sensor panel may be utilized to detect touch gestures along a top face and a side face of an electronic device (e.g., electronic device 102) while maximizing an internal volumetric efficiency of the electronic device.

Figure 5:
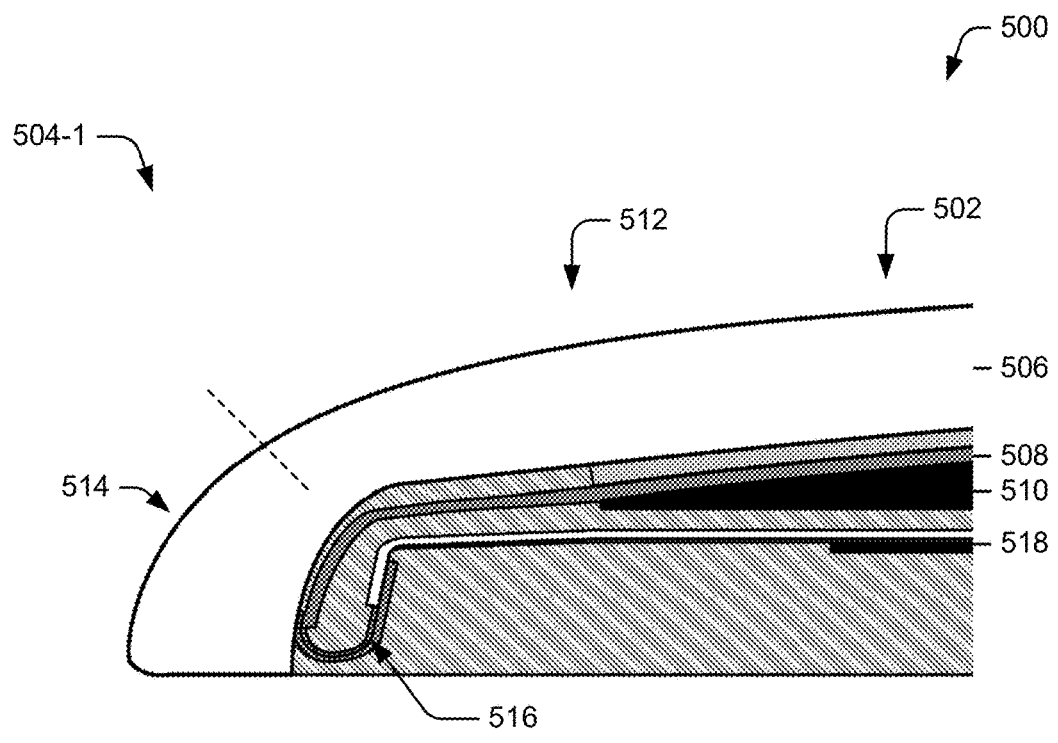
FIG. 5 illustrates two example implementations of a portion of the display panel stack in accordance with one or more implementations.
Figure 5:
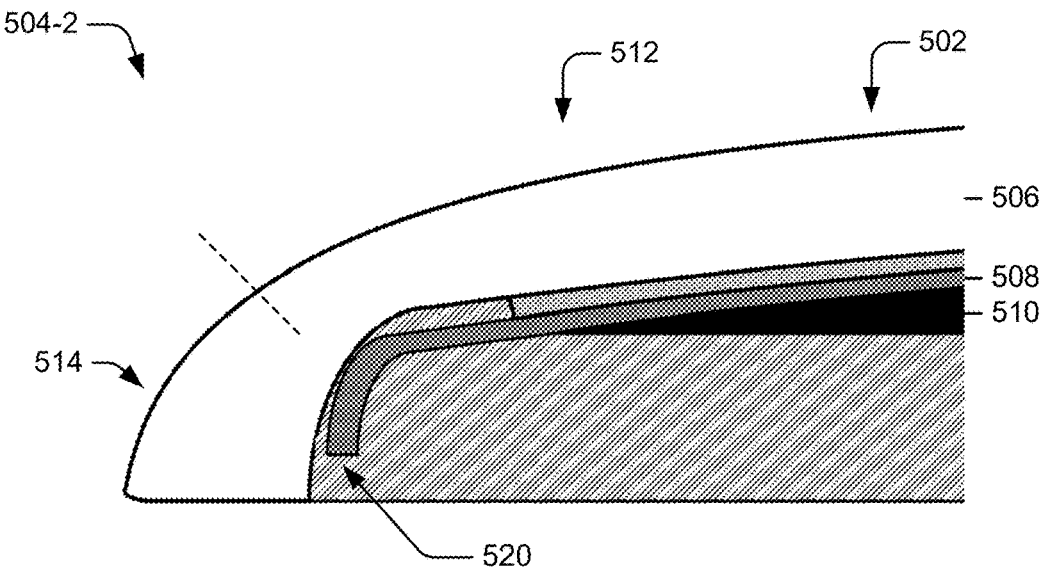

FIG. 5 illustrates two example implementations of a portion of the display panel stack 502 in accordance with one or more implementations. As illustrated, a first side 504-1 of the display panel stack 502 includes a cover layer 506, a touch sensor panel 508, and a display panel 510. The cover layer 506 includes a top face 512 and a side face 514. The touch sensor panel 508 may have an active area that is larger than an active area of the display panel 510 in at least one dimension (not illustrated in FIG. 5).

Extended regions of the touch sensor panel 508 may extend beyond at least one of a diameter, a length, or a width of the top face 512 of the cover layer 506 and extend substantially parallel with at least portions of the side face 514 of the cover layer, such that the extended regions are disposed adjacent to and follow a physical curvature of the cover layer 502 within the internal cavity from the top face 512 to the side face 514.

As illustrated, a first portion 516 of the extended regions may bend (e.g., into a "U" shape) within the internal cavity. In implementations, the portion 516 of the extended regions may form a connection (e.g., an electrical interface) between the touch sensor panel 508 and an integrated circuit 518. For example only and not by way of limitation, the integrated circuit 518 is disposed within the internal cavity adjacent to the display panel stack opposite the cover layer 506. In alternative implementations, the integrated circuit 518 is disposed within the internal cavity proximate but not adjacent to the display panel stack 502.

Further illustrated, on a second side 504-2 of the display stack 502, a second portion 520 of the extended regions of the touch sensor panel 508 may be disposed adjacent to and follow a physical curvature of the cover layer 502 within the internal cavity from the top face 512 to the side face 514. In this way, a single touch sensor panel may be utilized to detect touch gestures along a side face of an electronic device.

Figure 6:
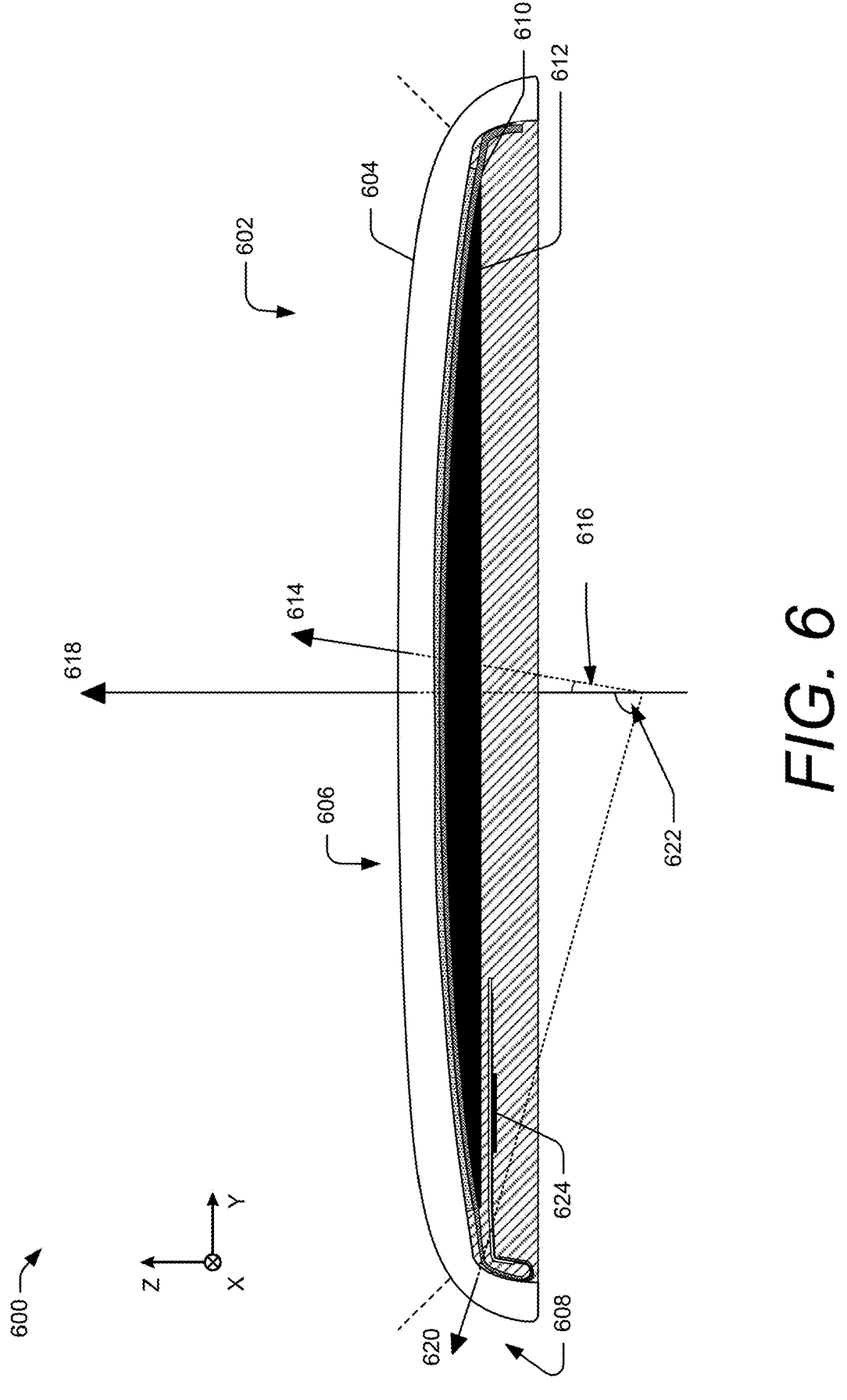
FIG. 6 illustrates an example of the display panel stack including the cover layer with the top face and the side face in accordance with one or more implementations.

FIG. 6 illustrates an example of a display panel stack 602 including the cover layer 604 with the top face 606 and the side face 608 in accordance with one or more implementations. As illustrated, the display panel stack 602 includes a cover layer 604, a touch sensor panel (e.g., a capacitive touch sensing panel) 610, and an electronic visual display panel 612 ("display panel 612"). The cover layer 604 includes a top face 606 and a side face 608. As illustrated, the top face 606 may have a first surface having a first point with a first normal vector 614 (e.g., a vector perpendicular to the slope of the surface at a point) with a first angle 616 from a z-axis 618 (e.g., pointing up through a middle of the display panel stack 602) that is less than or equal to 45 degrees. The side face 608 may have a second surface having a second point with a second normal vector 620 with a second angle 622 from the z-axis 618 that is greater than 45 degrees.

The top face 606 may be defined as a region where any normal vector of any point on the external surface of the cover layer 604 form an angle that is less than or equal to 45 degrees with the z-axis 618. The side face 608 may be defined as a region where the normal vectors of the points on the surface of the cover layer 604 form an angle that is greater than 45 degrees with the z-axis 618.

The display stack 602 also includes an integrated circuit 624. The integrated circuit 624 may be operatively coupled to and control the touch sensor panel 610 and the display panel 612. In implementations, the integrated circuit 624 may be implemented with TDDI, allowing the integrated circuit 624 to control both the touch sensor panel 610 and the display panel 612, despite the touch sensor panel 610 and the display panel 612 having different active area sizes, maximizing an internal volumetric efficiency of an electronic device. In this way, a single touch sensor panel may be utilized to detect touch gestures along a top face and a side face of an electronic device (e.g., electronic device 102).

Conclusion

Unless context dictates otherwise, use herein of the word "or" may be considered use of an "inclusive or," or a term that permits inclusion or application of one or more items that are linked by the word "or". Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying Drawings and terms discussed herein may be indicative of one or more items or terms, and thus reference may be made interchangeably to single or plural forms of the items and terms in this written description.

Although implementations directed at extending touch-sensitive regions in electronic devices have been described in language specific to certain features and/or methods, the subject of the appended Claims is not necessarily limited to the specific features or methods described. Rather, the specific features and methods are disclosed as example implementations directed at extending touch-sensitive regions in electronic devices.

What is claimed is:

1. An electronic device comprising:

a housing;

a display panel stack attached to the housing sufficient to define an internal cavity, the display panel stack having:

a cover layer disposed as a topmost layer, the cover layer including a top face and a side face, the top face having a normal axis less than or equal to 45 degrees from a z-axis, the side face having a normal axis greater than 45 degrees from a z-axis;

a touch sensor panel disposed beneath the cover layer, the touch sensor panel comprising a single, primary sensing layer having a first sensing region corresponding to a surface of the top face and a second sensing region at least partially corresponding to a second surface of the side face, the second sensing region of the touch sensor panel extending continuously from the first sensing region and substantially parallel with the second surface of the side face; and a display panel disposed beneath the touch sensor panel, the display panel having an active area corresponding at least partially to the first surface of the top face, the display panel dimensionally smaller than the touch sensor panel in at least one dimension; and an integrated circuit configured to control both the touch sensor panel and the display panel, the touch sensor panel having an extended region that is a portion of the single, primary sensing layer and extends from the second sensing region of the touch sensor panel in a U-shape away from the second surface of the side face to an electrical interface of the integrated circuit;

one or more processors; and memory storing instructions that, when executed by the one or more processors, cause the one or more processors to direct the integrated circuit to receive touch input data at the touch sensor panel and cause the display panel to illuminate.

2. The electronic device of claim 1, wherein:

the display panel comprises a first length and a first width;

the touch sensor panel comprises a second length and a second width; and at least one of the second length or the second width are larger than the first length or the second width, respectively.

3. The electronic device of claim 1, wherein:

the display panel comprises a first diameter;

the touch sensor panel comprises a first length and a first width; and at least one of the first length or the first width is larger than the first diameter.

4. The electronic device of claim 1, wherein:

the display panel comprises a first diameter;

the touch sensor panel comprises a second diameter; and the second diameter is larger than the first diameter.

5. The electronic device of claim 1, wherein the extended region of the touch sensor panel operatively connects to the electrical interface, the touch sensor panel and display panel being connected to the integrated circuit through the electrical interface.

6. The electronic device of claim 5, wherein the integrated circuit comprises a first driver for the touch sensor panel and a second driver for the display panel.

7. The electronic device of claim 1, wherein the integrated circuit is disposed beneath a bottommost layer of the display panel stack.

8. The electronic device of claim 1, wherein the memory further stores instructions that further cause the one or more processors to determine between a first touch input at the first surface of the top face or a second touch input at the second surface of the side face.

9. The electronic device of claim 8, wherein the memory further stores instructions that further cause the one or more processors to direct the integrated circuit to operate the display panel based on the determination between the first touch input or the second touch input.

10. The electronic device of claim 1, wherein the side face extends an entire perimeter of the top face.

11. The electronic device of claim 1, wherein the cover layer is substantially dome shaped.

12. The electronic device of claim 1, wherein the electronic device comprises a wearable device.

13. The electronic device of claim 1, wherein the touch sensor panel comprises a capacitive touch-sensing panel.

14. The electronic device of claim 1, wherein the display panel comprises an organic light-emitting diode display and the cover layer comprises a plastic material.

15. The electronic device of claim 1, wherein the touch sensor panel comprises an irregular shape having a dimension in at least one plane greater than or equal to a diameter of the cover layer.

16. The electronic device of claim 15, wherein a shortest dimension of the irregular shape in the at least one plane is greater than or equal to a diameter of the display panel active area.

17. The electronic device of claim 1, wherein the display panel is elliptically shaped.

18. The electronic device of claim 1, wherein at least one of the display panel, the touch sensor panel, or the cover layer share a geometric center.

19. The electronic device of claim 1, wherein the extended region of the touch sensor panel comprises a non-sensing region that extends continuously from the second sensing region in the U-shape away from the second surface of the side face of the cover layer.

20. The electronic device of claim 1, wherein the integrated circuit is disposed on a substrate having a curved portion that supports the electrical interface to which the extended region of the touch sensor panel is coupled.

* * * * *